United States Patent
Otsuka et al.

(10) Patent No.: US 10,742,021 B1
(45) Date of Patent: Aug. 11, 2020

(54) POWER CIRCUIT, CONTROL METHOD OF POWER CIRCUIT, AND SELF-DRIVING DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventors: Masafumi Otsuka, Yokohama Kanagawa (JP); Yuji Yamanaka, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/566,589

(22) Filed: Sep. 10, 2019

(30) Foreign Application Priority Data

Mar. 19, 2019 (JP) .................. 2019-050973

(51) Int. Cl.
*H02M 3/158* (2006.01)
*H02H 7/12* (2006.01)
*H02H 1/00* (2006.01)
*G05F 3/20* (2006.01)

(52) U.S. Cl.
CPC ............ *H02H 7/1213* (2013.01); *G05F 3/20* (2013.01); *H02H 1/0007* (2013.01); *H02M 3/1582* (2013.01); *H02M 3/1584* (2013.01)

(58) Field of Classification Search
CPC .......................... H02M 3/1582; H02M 3/1584
USPC .................................................. 323/283–285
See application file for complete search history.

(56) References Cited

U.S. PATENT DOCUMENTS

| | | | |
|---|---|---|---|
| 8,879,281 B2 | 11/2014 | Sonobe | |
| 2001/0004205 A1* | 6/2001 | Miller | H02J 7/1423 323/224 |
| 2011/0037446 A1* | 2/2011 | Engelhardt | H02M 3/1582 323/282 |
| 2015/0280486 A1* | 10/2015 | Hsu | B60L 53/16 320/107 |
| 2015/0303803 A1* | 10/2015 | Chen | H02M 3/158 323/271 |
| 2017/0040898 A1* | 2/2017 | Hong | H02M 3/1582 |
| 2017/0305278 A1* | 10/2017 | Geyer | H02M 1/10 |

FOREIGN PATENT DOCUMENTS

| | | |
|---|---|---|
| JP | H11-146635 A | 5/1999 |
| JP | 5987586 B2 | 9/2016 |
| JP | 2017-79567 A | 4/2017 |

* cited by examiner

*Primary Examiner* — Gary A Nash (57) ABSTRACT

According to an embodiment, a power circuit supplying a voltage or a current from an output terminal to a load comprises a first circuit, a second circuit, an inductor, a fifth switching element, and a control circuit. The control circuit is configured to bring the fifth switching element into conduction when switching control on at least two of the first to fourth switching elements is to be executed according to an output to the load connected via the output terminal, and bring the fifth switching element into non-conduction after a delay time passes from a time the first to fourth switching elements have been brought into non-conduction when the first to fourth switching elements are to be brought into non-conduction.

18 Claims, 9 Drawing Sheets

POWER CIRCUIT, CONTROL METHOD OF POWER CIRCUIT, AND SELF-DRIVING DEVICE

CROSS-REFERENCE TO RELATED APPLICATIONS

This application is based upon and claims the benefit of priority from Japanese Patent Application No. 2019-050973, filed on Mar. 19, 2019; the entire contents of which are incorporated herein by reference.

FIELD

The embodiments relate to a power circuit, a control method of a power circuit, and a self-driving device.

BACKGROUND

In order to realize self-driving, on-board products need to meet stricter functional safety requirements than conventional products. Therefore, when detecting an abnormal state, a power circuit of a DC-DC converter or the like interrupts an output voltage thereof to protect a load connected to the power circuit. However, there is a possibility that the power circuit itself is damaged due to such an abrupt interrupt of the output voltage.

DETAILED DESCRIPTION

According to an embodiment, a power circuit supplying a voltage or a current from an output terminal to a load comprises a first circuit, a second circuit, an inductor, a fifth switching element, and a control circuit. The first circuit comprises a first switching element having one end connected to a first node, a second switching element having one end connected to the first node and the other end connected to a GND terminal, and a parasitic diode connected in parallel to the first switching element and configured to pass a current in a direction of the load. The second circuit comprises a third switching element having one end connected to a power supply of a higher potential than that of the GND terminal and the other end connected to a second node, and a fourth switching element having one end connected to the second node and the other end connected to the GND terminal. The inductor is connected between the first node and the second node. The fifth switching element is connected between the other end of the first switching element and the output terminal. The control circuit is configured to bring the fifth switching element into conduction when switching control on at least two of the first to fourth switching elements is to be executed according to an output to the load connected via the output terminal, and bring the fifth switching element into non-conduction after a delay time passes from a time the first to fourth switching elements have been brought into non-conduction when the first to fourth switching elements are to be brought into non-conduction.

A power circuit and a control method of a power circuit, and a self-driving device according to embodiments of the present invention will now be explained in detail with reference to the accompanying drawings. The embodiments described below are only examples of the embodiments of the present invention and the present invention is not limited to the embodiments. In the drawings referred in the embodiments, the same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

Figure 1:
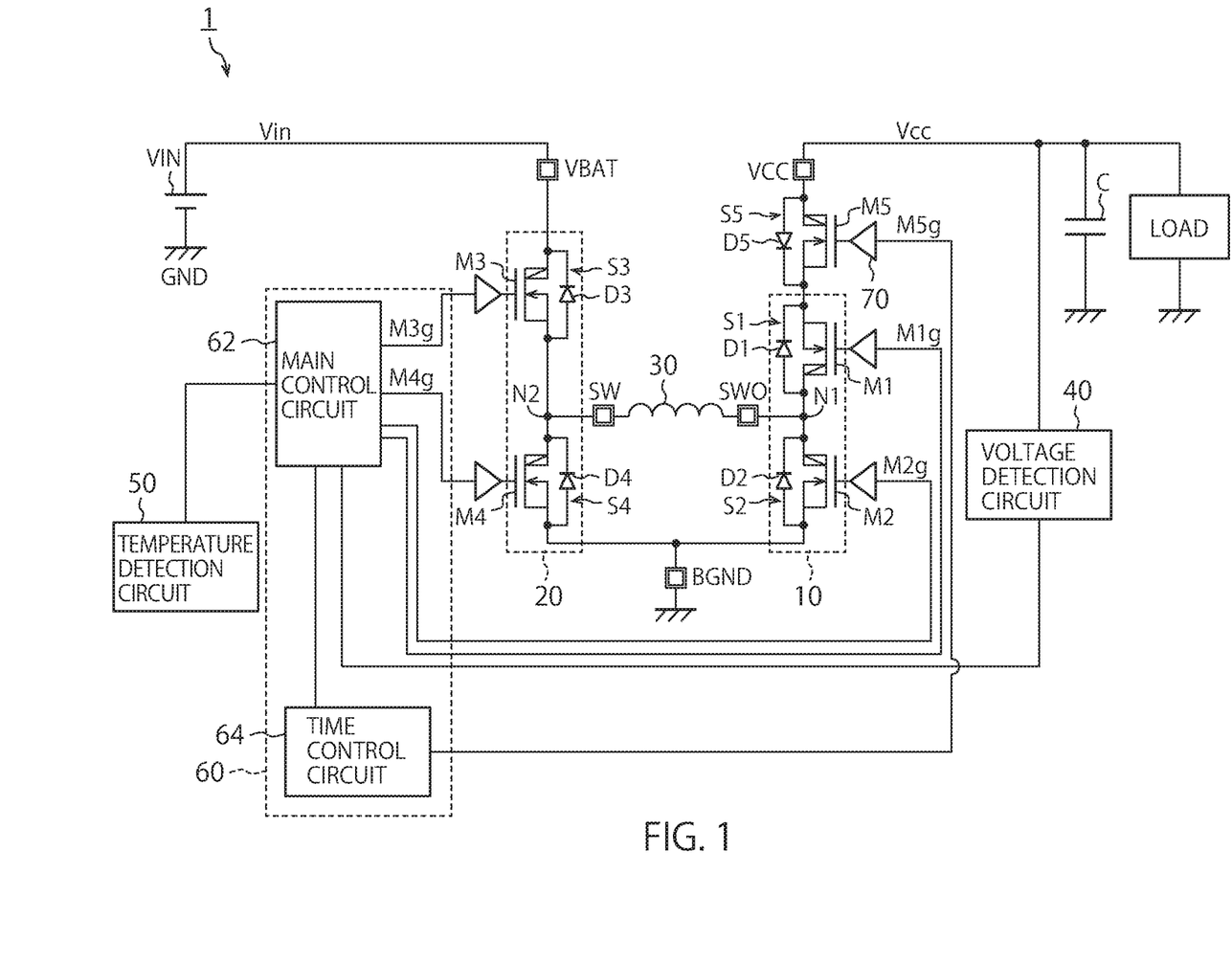
FIG. 1 is a block diagram illustrating a configuration of a power circuit according to a first embodiment.

FIG. 1 is a block diagram illustrating a configuration of a power circuit 1 according to a first embodiment.

The power circuit 1 is a circuit that controls an input voltage Vin supplied from a high-potential power supply VIN to supply an output voltage Vcc from a power-supply voltage output terminal VCC to a load connected to the power-supply voltage output terminal VCC. The power circuit 1 can be used as a power supply of a self-driving device that autonomously drives an automobile. The power circuit 1 includes a first circuit 10, a second circuit 20, an inductor 30, a voltage detection circuit 40, a temperature detection circuit 50, a control circuit 60, a plurality of drivers 70, a fifth switching unit S5, and a capacitor C. The components described above of the power circuit 1 will be explained later.

FIG. 1 illustrates the high-potential power supply VIN corresponding to an input side of the power circuit 1, and the power-supply voltage output terminal VCC corresponding to an output side of the power circuit 1 and connected to a load. The potential of the high-potential power supply VIN is Vin and the potential of the power-supply voltage output terminal VCC is Vcc.

FIG. 1 also illustrates gate signals M1g to M5g for controlling the first circuit 10, the second circuit 20, and the fifth switching unit S5, a ground GND, a power-supply terminal VBAT, a GND terminal BGND, switch terminals SW and SWO, the load, a first node N1, a second node N2, and the like.

The first circuit 10 is a step-up circuit and has a first switching unit S1 and a second switching unit S2 connected in series via the first node N1. An end of the first switching unit S1 on the opposite side to the first node N1 is connected to the power-supply voltage output terminal VCC via the fifth switching unit S5.

The first switching unit S1 has a first switching element M1, and a parasitic diode D1 connected in parallel to the first switching element M1 and passing a current in a direction of the load. The first switching unit S1 is, for example, an n-channel MOSFET (Metal-Oxide-Semiconductor Field-Effect Transistor). The first switching element M1 is controlled to be brought into conduction when the gate signal M1g is a high-level signal (H signal) and to be brought into non-conduction when the gate signal M1g is a low-level signal (L signal).

The second switching unit S2 has an identical configuration to that of the first switching unit S1. That is, the second switching unit S2 has a second switching element M2 having one end connected to the first node N1 and the other end on the opposite side to the first node N1 connected to the GND terminal BGND, and a parasitic diode D2 connected in parallel to the second switching element M2 and passing a current in the direction of the load. Conduction and non-conduction of the second switching element M2 are controlled by an "H" signal and an "L" signal of the gate signal M2g similarly to the first switching element M1.

The second circuit 20 is a step-down circuit and has a third switching unit S3 and a fourth switching unit S4 connected in series via the second node N2. The third switching unit S3 and the fourth switching unit S4 have identical configurations to those of the first switching unit S1 and the second switching unit S2. That is, the second circuit 20 includes a third switching element M3 having one end connected to the high-potential power supply VIN and the other end connected to the second node N2, and a fourth switching element M4 having one end connected to the second node N2 and the other end connected to the GND terminal BGND. Further, the third switching element M3 and the fourth switching element M4 are respectively paired with a parasitic diode D3 connected in parallel to the third switching unit M3 and allowing a current to flow in a direction of the high-potential power supply VIN and a parasitic diode D4 connected in parallel to the fourth switching element M4 and allowing a current to flow in the direction of the high-potential power supply VIN. Conduction and non-conduction of the third switching element M3 and the fourth switching element M4 are controlled by the gate signals M3g and M4g, respectively.

The inductor 30 is connected between the switch terminal SWO connected to the first node N1 and the switch terminal SW connected to the second node N2.

The fifth switching unit S5 is connected between the other end (a node on the opposite side to the first node N1) of the first switching element M1 of the first switching unit S1 and the power-supply voltage output terminal VCC. The fifth switching unit S5 also has an identical configuration to that of the first switching unit S1. That is, a fifth switching element M5 has one end connected to the other end (the node on the opposite side to the first node N1) of the first switching element M1 and the other end connected to the power-supply voltage output terminal VCC. A parasitic diode D5 is further connected in parallel to the fifth switching element M5 and allowing a current to flow in the opposite direction to the direction of the load. Conduction and non-conduction of the fifth switching element M5 are controlled by "H" and "L" signals of the gate signal M5g similarly to the first switching element M1. While being constituted by n-channel MOSFETs, the first to fifth switching units S1 to S5 according to the present embodiment are not limited thereto and may be constituted by, for example, p-channel MOSFETs.

The voltage detection circuit (an output-short protection circuit) 40 is connected to the power-supply voltage output terminal VCC and the control circuit 60. The voltage detection circuit 40 detects the output voltage Vcc to be supplied from the power-supply voltage output terminal VCC to the load and outputs a voltage signal including voltage information thereof to the control circuit 60. When the voltage value of the output voltage Vcc detected by the voltage detection circuit 40 exceeds a predetermined range set in advance, the voltage detection circuit 40 outputs an abnormality detection signal to the control circuit 60.

While detecting the output voltage Vcc in the explanations of the embodiment, the voltage detection circuit 40 may detect an output current from the power-supply voltage output terminal VCC. In this case, when the output current from the power-supply voltage output terminal VCC exceeds a predetermined range set in advance, the voltage detection circuit 40 outputs an abnormality detection signal to the control circuit 60.

The temperature detection circuit (an overheat protection circuit) 50 is connected to the control circuit 60. The temperature detection circuit 50 detects the temperature in the power circuit 1, for example, the temperature of a semiconductor chip on which the inductor 30 is placed, and outputs a temperature signal including temperature information to the control circuit 60. The temperature detection circuit 50 outputs an abnormality detection signal to the control circuit 60 when the temperature exceeds a predetermined range set in advance.

The high-potential power supply VIN is a DC power supply connected to the power-supply terminal VBAT and outputting a DC voltage. The capacitor C is connected between the power-supply voltage output terminal VCC and the GND terminal BGND.

The control circuit 60 is connected to respective gates of the first to fifth switching elements M1 to M5 via the corresponding drivers 70, respectively. The control circuit 60 is configured to include a main control circuit 62 (including a CPU (Central Processing Unit), for example) and a time control circuit 64, and outputs the gate signals M1g to M5g controlling the first to fifth switching elements M1 to M5 according to the value of the output voltage Vcc supplied to the load.

More specifically, the main control circuit 62 enables switching control of switching among a step-up mode to execute step-up control, a step-down mode to execute step-down control, and a step-up/down mode to execute step-up/down control to the first to fourth switching elements M1 to M4 according to the output voltage Vcc. In this switching control, switching control on at least two of the first to fourth switching elements M1 to M4 is executed.

The main control circuit 62 brings all the first to fourth switching elements M1 to M4 into non-conduction in response to an abnormality detection signal from either the voltage detection circuit 40 or the temperature detection circuit 50. That is, when an abnormality is detected, the main control circuit 62 switches all the gate signals M1g to M4g for the first to fourth switching elements M1 to M4 to the low-level (L) signal. At this time, the gate signal M5g for the fifth switching element M5 is still the high-level (H) signal.

The time control circuit 64 controls a timing of bringing the fifth switching element M5 into conduction or non-conduction in accordance with a shutdown signal SHUTDOWN. For example, when the fifth switching element M5 is to be brought into non-conduction in response to an abnormality detection signal, the time control circuit 64 controls a delay time T from a time the first to fourth switching elements M1 to M4 have been brought into non-conduction until the fifth switching element M5 is brought into non-conduction. Specifically, the time control circuit 64 sets the delay time T to a time when energy stored in the inductor 30 becomes equal to or lower than a predetermined level, and switches the gate signal M5g for the fifth switching element M5 from the high-level signal to the low-level signal at that timing to bring the fifth switching element M5 into non-conduction.

The delay time T can be set, for example, using an expression (1). In this expression, L denotes the inductance of the inductor 30, C denotes the output capacitance of the capacitor C, WOUT denotes the load power of the load, and I denotes the coil current flowing through the inductor 30. The coil current I is also denoted as coil current Icoil.

[Expression 1]

$$T = \frac{1}{2}\sqrt{L \times C}\frac{1}{WOUT}I \quad (1)$$

In this way, the control circuit 60 brings the fifth switching element M5 into conduction when the switching control on at least two of the first to fourth switching elements M1 to M4 is to be executed according to the output voltage Vcc to the load connected via the power-supply voltage output terminal VCC, and brings the fifth switching element M5 into non-conduction after the delay time T passes from the time the first to fourth switching elements M1 to M4 have been all brought into non-conduction when the first to fourth switching elements M1 to M4 are to be brought into non-conduction.

The drivers 70 are connected to the corresponding first to fifth switching elements M1 to M5, respectively, and to the control circuit 60. The drivers 70 amplify the gate signals M1g to M5g controlling the corresponding first to fifth switching elements M1 to M5, respectively.

The foregoing is explanations of the configuration of the power circuit 1 according to the first embodiment. An operation example thereof is explained below.

Figure 2A:
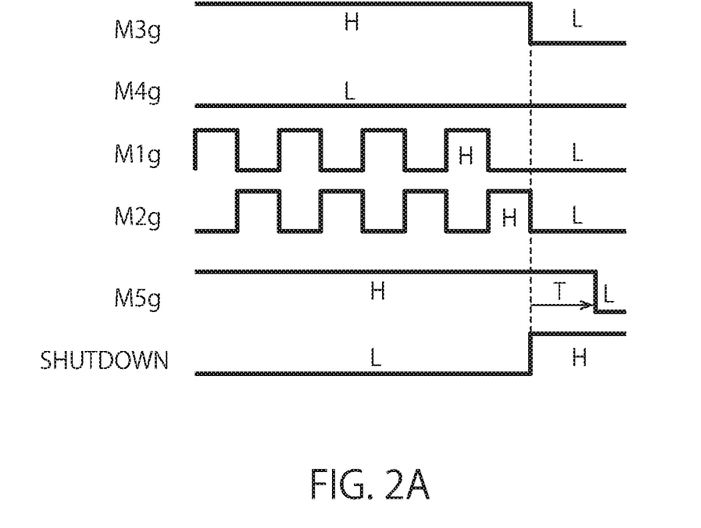
FIG. 2A is a timing chart in a step-up mode.
Figure 2B:
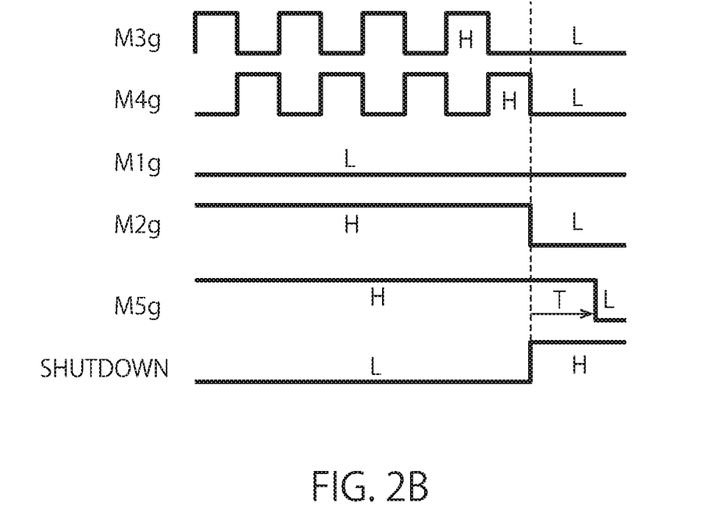
FIG. 2B is a timing chart in a step-down mode.
Figure 2C:
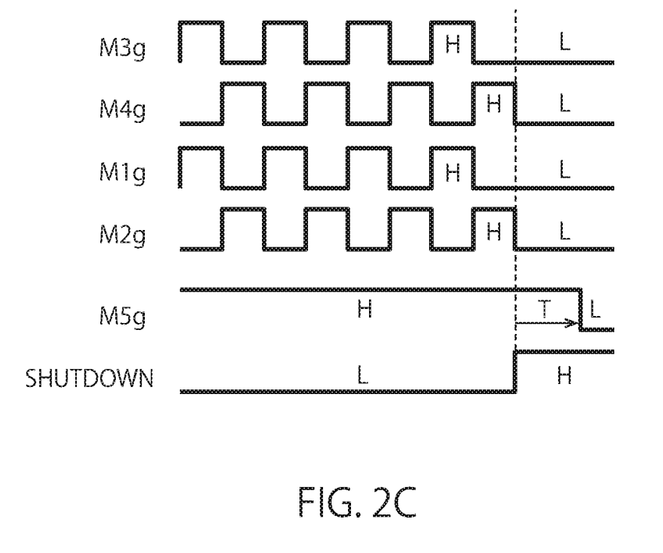
FIG. 2C is a timing chart in a step-up/down mode.

FIG. 2A is a timing chart illustrating a relation among the gate signals M1g to M5g for the first to fifth switching elements M1 to M5 and the shutdown signal SHUTDOWN in the step-up mode. FIG. 2B is a timing chart illustrating the switching elements M1 to M5 in the step-down mode. FIG. 2C is a timing chart illustrating the switching elements M1 to M5 in the step-up/down mode. The gate signals M3g, M4g, M2g, M1g, and M5g and the shutdown signal SHUTDOWN are illustrated in this order from the top. The vertical axis represents respective values of the signals and the horizontal axis represents a time. The delay time T is a time represented by the expression (1). It is assumed that the first to fifth switching elements M1 to M5 are brought into conduction with the H signal and are brought into non-conduction with the L signal in the present embodiment.

When the third and fifth switching elements M3 and M5 are brought into conduction and the fourth switching element M4 is brought into non-conduction as illustrated in FIG. 2A, the power circuit 1 operates as a step-up DC-DC converter having a relation Vin<Vcc. The output voltage Vcc in this case is determined by a ratio Dtg2 of the conduction time of the second switching element M2 as represented by an expression (2). That is, when executing step-up control by alternately switching the first and second switching elements M1 and M2, the control circuit 60 brings the third and fifth switching elements M3 and M5 into conduction and brings the fourth switching element M4 into non-conduction. Dtg2 is a value obtained by dividing the conduction time of the second switching element M2 by an addition value of the conduction time of the first switching element M1 and the conduction time of the second switching element M2. Dtg2 is a value smaller than 1.

[Expression 2]

$$Vcc = \frac{1}{1 - Dtg2} \times Vin \quad (2)$$

The main control circuit 62 alternately generates the high-level signals (H signals) and the low-level signals (L signals) of the gate signal M1g and the gate signal M2g at the time of a normal step-up operation. Accordingly, when the gate signal M1g is the high-level signal, the first switching element M1 is brought into conduction and the second switching element M2 is brought into non-conduction. Conversely, when the gate signal M1g is the low-level signal, the first switching element M1 is brought into non-conduction and the second switching element M2 is brought into conduction.

Meanwhile, when an abnormality detection signal is input from the voltage detection circuit 40 or the temperature detection circuit 50 as described above, the main control circuit 62 provides the low-level signal (L signal) as the gate signals M3g, M4g, M1g, and M2g to the third, fourth, first, and second switching elements M3, M4, M1, and M2, respectively. At the same time, the main control circuit 62 provides the high-level signal (H signal) as the shutdown signal SHUTDOWN to the time control circuit 64 in response to input of the abnormality detection signal. With the time control circuit 64, after the predetermined delay time (the expression (1)) passes, the gate signal Mg5 for the fifth switching element M5 is switched to the low-level signal and the fifth switching element M5 is brought into non-conduction.

In this way, when an abnormality detection signal is input while the step-up control is being executed, the control circuit 60 brings the first, second, and third switching elements M1, M2, and M3 into non-conduction. After the predetermined delay time T passes from that time, the control circuit 60 brings the fifth switching element M5 into non-conduction. Accordingly, the coil energy of the inductor 30 can be discharged via the power-supply voltage output terminal VCC during the delay time T and therefore occurrence of an overvoltage at the switch terminal SWO after the fifth switching element M5 is brought into non-conduction can be suppressed.

When the first and fifth switching elements M1 and M5 are brought into conduction and the second switching element M2 is brought into non-conduction as illustrated in FIG. 2B, the power circuit 1 operates as a step-down DC-DC converter having a relation Vin>Vcc. The output voltage Vcc in this case is determined by a ratio Dtg3 of the conduction time of the third switching element M3 as represented by an expression (3). That is, when executing step-down control by alternately switching the third and fourth switching elements M3 and M4, the control circuit 60 brings the first and fifth switching elements M1 and M5 into conduction and brings the second switching element M2 into non-conduction. Dtg3 is a value obtained by dividing the conduction time of the third switching element M3 by an addition value of the conduction time of the third switching element M3 and the conduction time of the fourth switching element M4. Dtg3 is a value smaller than 1.

[Expression 3]

$$Vcc = Dtg3 \times Vin \quad (3)$$

The main control circuit 62 alternately generates the high-level signals (H signals) and the low-level signals (L signals) of the gate signal M3g and the gate signal M4g at the time of a normal step-down operation. Accordingly, when the gate signal M3g is the high-level signal, the third switching element M3 is brought into conduction and the fourth switching element M4 is brought into non-conduction. Conversely, when the gate signal M3g is the low-level signal, the third switching element M3 is brought into non-conduction and the fourth switching element M4 is brought into conduction.

Meanwhile, when an abnormality detection signal is input from the voltage detection circuit 40 or the temperature detection circuit 50 as described above, the main control circuit 62 provides the low-level signal (L signal) as the gate signals M3g, M4g, M1g, and M2g to the third, fourth, first, and second switching elements M3, M4, M1, and M2, respectively. At the same time, the main control circuit 62 provides the high-level signal (H signal) as the shutdown signal SHUTDOWN to the time control circuit 64 in response to input of the abnormality detection signal. With the time control circuit 64, after the predetermined delay time T (the expression (1)) passes, the gate signal M5g for the fifth switching element M5 is switched to the low-level signal and the fifth switching element M5 is brought into non-conduction.

In this way, when an abnormality detection signal is input while the step-down control is being executed, the control circuit 60 brings the first, third, and fourth switching elements M1, M3, and M4 into non-conduction. After the predetermined delay time T passes from that time, the control circuit 60 brings the fifth switching element M5 into non-conduction. Accordingly, the coil energy of the inductor 30 can be discharged via the power-supply voltage output terminal VCC during the delay time T and therefore occurrence of an overvoltage at the switch terminal SWO after the fifth switching element M5 is brought into non-conduction can be suppressed.

As illustrated in FIG. 2C, the control circuit 60 brings the fifth switching element M5 into conduction when executing step-up/down control by switching the first to fourth switching elements M1 to M4.

The main control circuit 62 synchronizes the gate signal M1g and the gate signal M3g with each other and synchronizes the gate signal M2g and the gate signal M4g with each other at the time of a normal step-up/down operation. Accordingly, when the gate signals M1g and M3g are the high-level signals, the first and third switching elements M1 and M3 are brought into conduction and the second and fourth switching elements M2 and M4 are brought into non-conduction. Conversely, when the gate signals M1g and M3g are the low-level signals, the first and third switching elements M1 and M3 are brought into non-conduction and the second and fourth switching elements M2 and M4 are brought into conduction.

Meanwhile, when an abnormality detection signal is input from the voltage detection circuit 40 or the temperature detection circuit 50 as described above, the main control circuit 62 provides the low-level signal (L signal) as the gate signals M3g, M4g, M1g, and M2g to the third, fourth, first, and second switching elements M3, M4, M1, and M2, respectively. At the same time, the main control circuit 62 provides the high-level signal (H signal) as the shutdown signal SHUTDOWN to the time control circuit 64 in response to input of the abnormality detection signal. With the time control circuit 64, after the predetermined delay time T (the expression (1)) passes, the gate signal M5g for the fifth switching element M5 is switched to the low-level signal and the fifth switching element M5 is brought into non-conduction.

In this way, when an abnormality detection signal is input while the step-up/down control is being executed, the control circuit 60 brings the first to fourth switching elements M1 to M4 into non-conduction. After the predetermined delay time T passes from that time, the control circuit 60 brings the fifth switching element M5 into non-conduction. Accordingly, the coil energy of the inductor 30 can be discharged via the power-supply voltage output terminal VCC during the delay time T and therefore occurrence of an overvoltage at the switch terminal SWO after the fifth switching element M5 is brought into non-conduction can be suppressed.

Figure 3A:
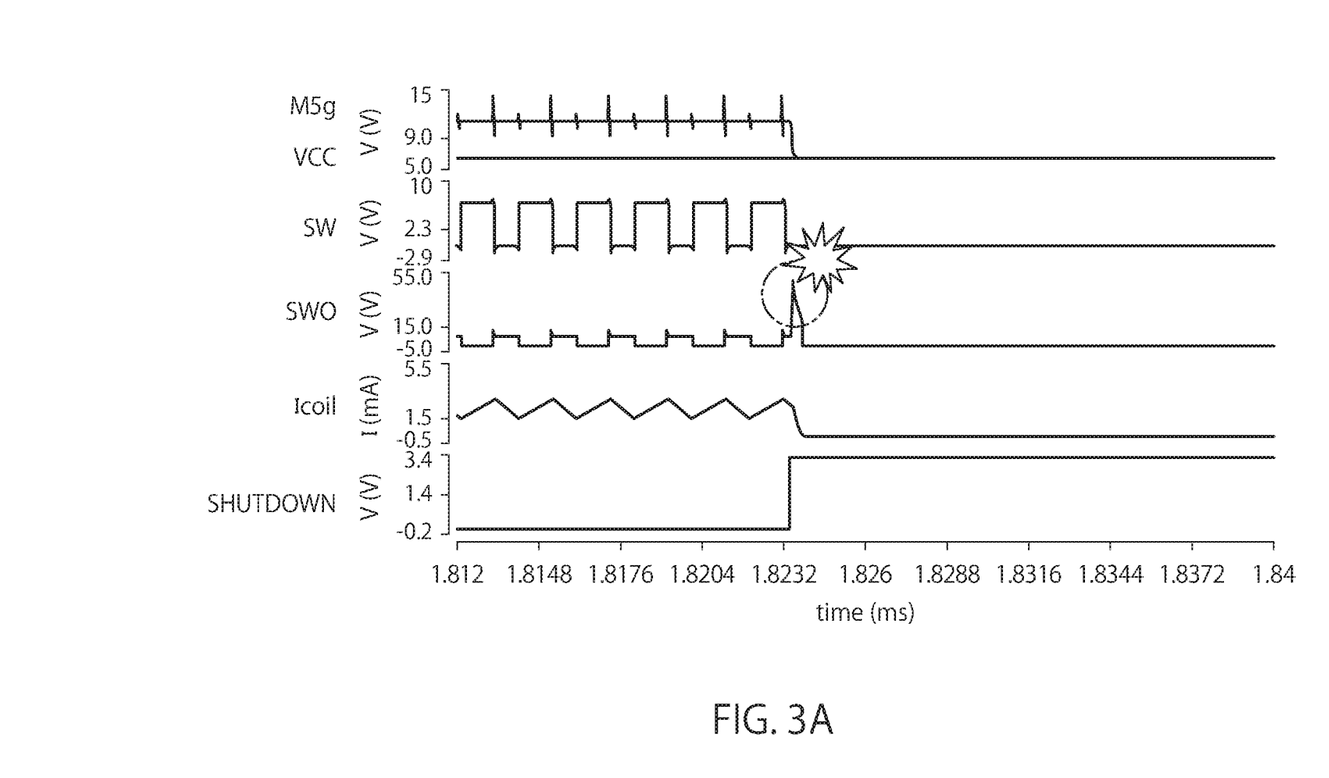
FIG. 3A is a timing chart of a case where shutdown processing is performed assuming that a delay time T=0.
Figure 3B:
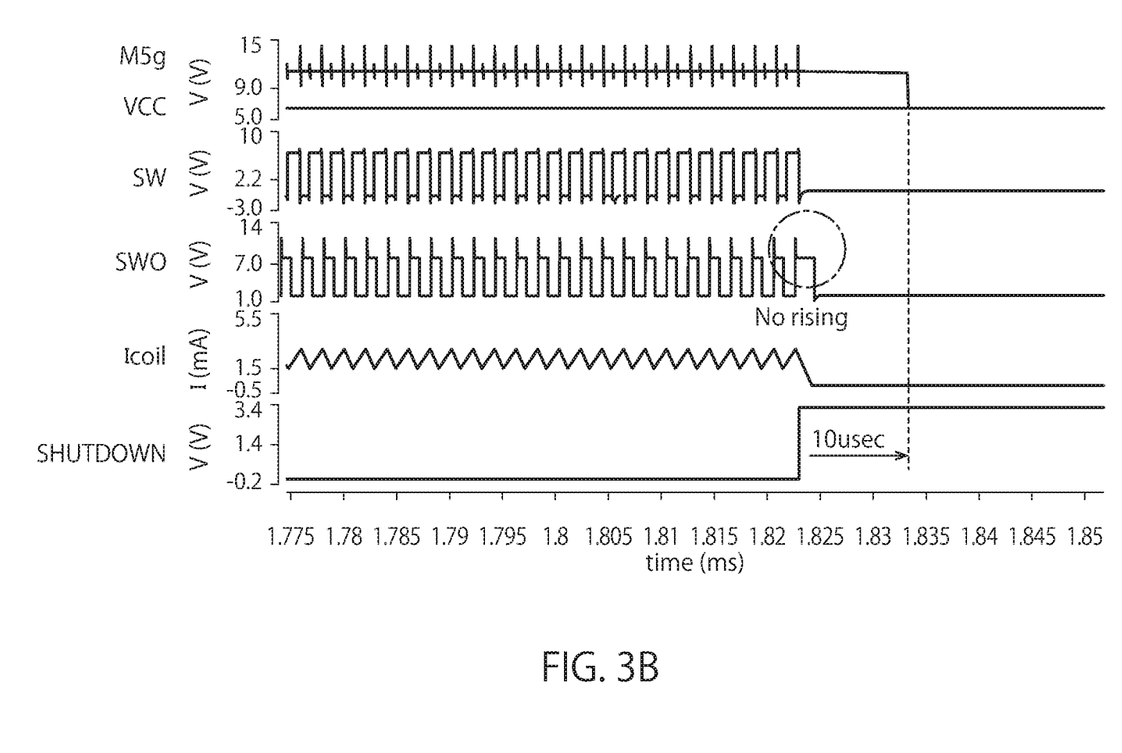
FIG. 3B is a timing chart of a case where shutdown processing is performed assuming that the delay time T is set according to an expression (1)

FIG. 3A is a timing chart of a case where shutdown processing is performed assuming that the delay time T=0 in the step-up/down mode. FIG. 3B is a timing chart of a case where shutdown processing is performed when the delay time T is set according to the expression (1) in the step-up/down mode. The voltages of the fifth switching element M5, the power-supply voltage output terminal VCC, the switch terminal SW, and the switch terminal SWO, the coil current Icoil of the conductor 30, and the shutdown signal SHUTDOWN are illustrated in this order from the top.

As illustrated in FIG. 3A, when the fifth switching element M5 is brought into non-conduction, a pathway through which the coil current Icoil of the conductor 30 flows is lost and the overvoltage of the switch terminal SWO increases up to a voltage represented by an expression (4). If an overvoltage V exceeds the breakdown voltage of the second switching element M2, the second switching element M2 is broken. In the expression (4), Cpara denotes the parasitic capacitance in the switch terminal SWO.

[Expression 4]

$$V = \sqrt{\frac{L}{C_{para}}} I \qquad (4)$$

On the other hand, in the case where the delay time T is set according to the expression (1) in the step-up/down mode, occurrence of the overvoltage V due to the inductor 30 is suppressed as illustrated in FIG. 3B even when the shutdown processing is performed.

Figure 4:
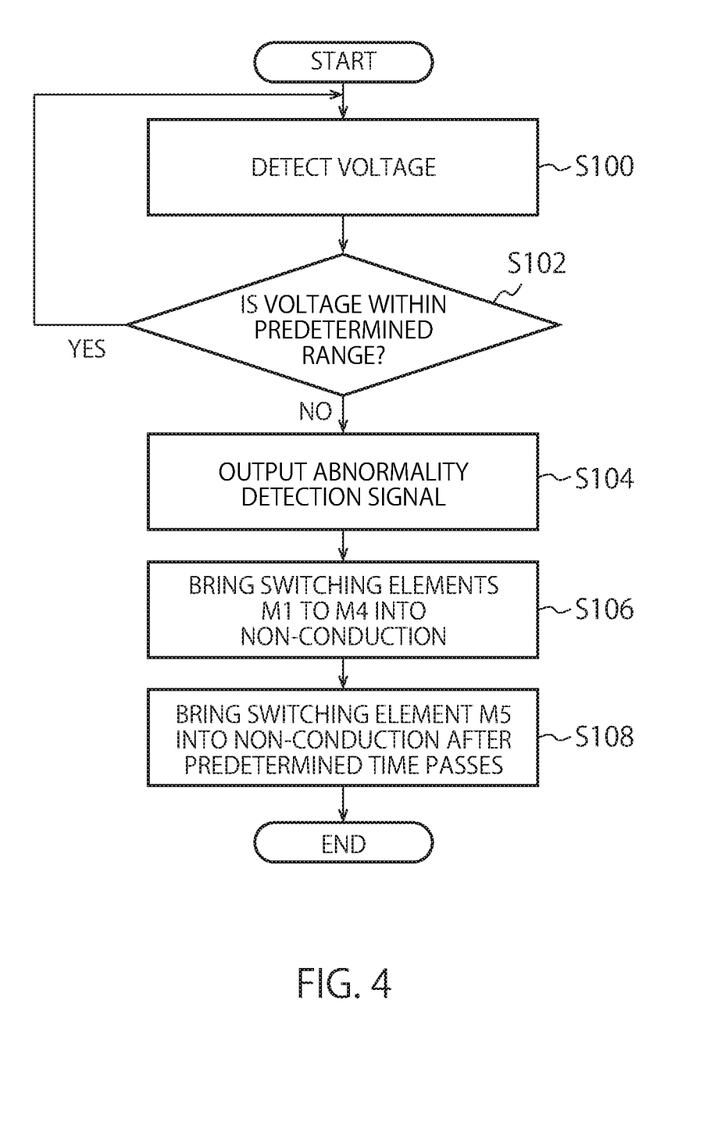
FIG. 4 is a flowchart illustrating an example of a control method of the power circuit.

FIG. 4 is a flowchart illustrating an example of a control method of the power circuit 1. An operation example at a time of detecting a voltage abnormality in the step-up/down mode is explained below.

The voltage detection circuit 40 detects the voltage Vcc of the power-supply voltage output terminal VCC (Step S100) and determines whether the voltage Vcc is within a predetermined range (Step S102). When the voltage Vcc is within the predetermined range (YES at Step S102), the voltage detection circuit 40 outputs a voltage signal to the control circuit 60 and repeats the processes from Step S100.

On the other hand, when the voltage Vcc is not within the predetermined range (NO at Step S102), the voltage detection circuit 40 outputs an abnormality detection signal to the control circuit 60 (Step S104). Subsequently, the main control circuit 62 provides the low-level signal (L signal) as the gate signals M3g, M4g, M1g, and M2g. At the same time, the main control circuit 62 provides the high-level signal (H signal) as the shutdown signal SHUTDOWN to the time control circuit 64 in response to input of the abnormality detection signal (Step S106).

Subsequently, after the predetermined delay time T (the expression (1)) passes, the time control circuit 64 switches the gate signal M5g for the fifth switching element M5 to the low-level signal to bring the fifth switching element M5 into non-conduction (Step S108) and ends the entire processing.

As described above, according to the present embodiment, when the first to fourth switching elements M1 to M4 are to be brought into non-conduction, the fifth switching element M5 is brought into non-conduction after the delay time T passes from a time the first to fourth switching elements M1 to M4 have been all brought into non-conduction. Accordingly, the coil energy of the inductor 30 is discharged to the capacitor C and the load via the power-supply voltage output terminal VCC during the delay time T and therefore occurrence of an overvoltage due to the inductor 30 after the fifth switching element M5 is brought into non-conduction can be suppressed.

Second Embodiment

Figure 5:
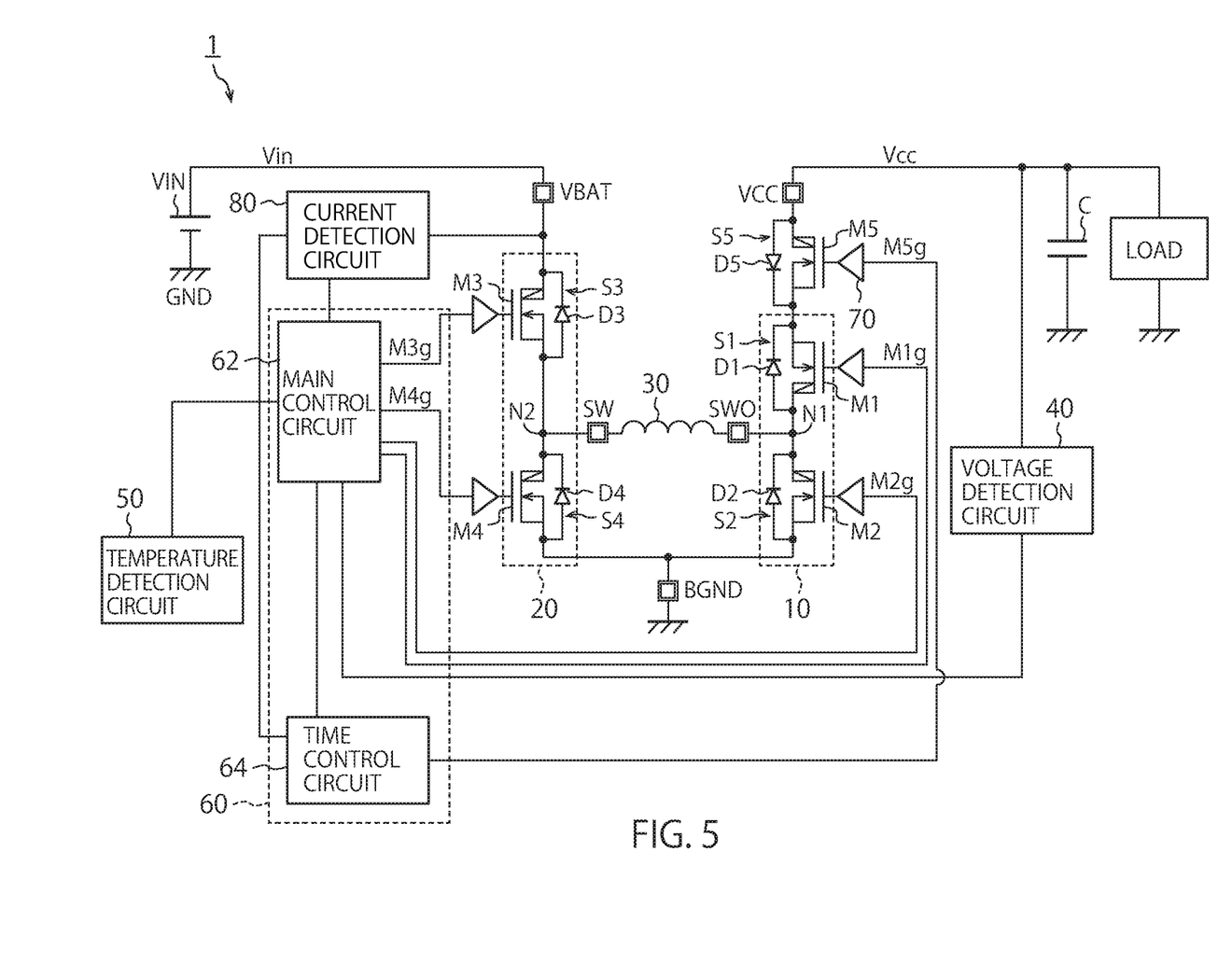
FIG. 5 is a block diagram illustrating a configuration of a power circuit according to a second embodiment.

While the delay time T set by the time control circuit 64 according to the first embodiment is a fixed value, the time control circuit 64 according to a second embodiment is different in that the delay time T is a variable value. Differences from the power circuit 1 according to the first embodiment are explained below. FIG. 5 is a block diagram illustrating a configuration of the power circuit 1 according to the second embodiment. As illustrated in FIG. 5, the power circuit 1 according to the second embodiment is different from the power circuit 1 according to the first embodiment in further including a current detection circuit 80.

The current detection circuit 80 is connected to the power-supply terminal VBAT and the control circuit 60. The current detection circuit 80 detects the coil current I flowing through the inductor 30 and outputs a current signal including information of the coil current I to the control circuit 60.

The time control circuit 64 computes the delay time T (an expression (5)) on the basis of the coil current I. That is, the time control circuit 64 sets the delay time T proportional to a constant-A multiple of the coil current I. Wmin is minimum load power in the load of the power circuit 1, which is defined by a setting value.

[Expression 5]

$$T = \frac{1}{2}\sqrt{LC_{VCC}}\frac{1}{W_{min}}I \propto AI \quad (5)$$

As described above, according to the present embodiment, the time control circuit 64 sets the delay time T proportional to the constant-A multiple of the coil current I. Therefore, the fifth switching element M5 can be brought into non-conduction in a shorter time than in the case where the delay time T is a fixed value while occurrence of an overvoltage is suppressed.

Third Embodiment

While the power circuit 1 according to the first embodiment has the second circuit 20 for stepping-down, the power circuit 1 according to a third embodiment is different in not having the second circuit 20. Differences from the power circuit 1 according to the first embodiment are explained below.

Figure 6:
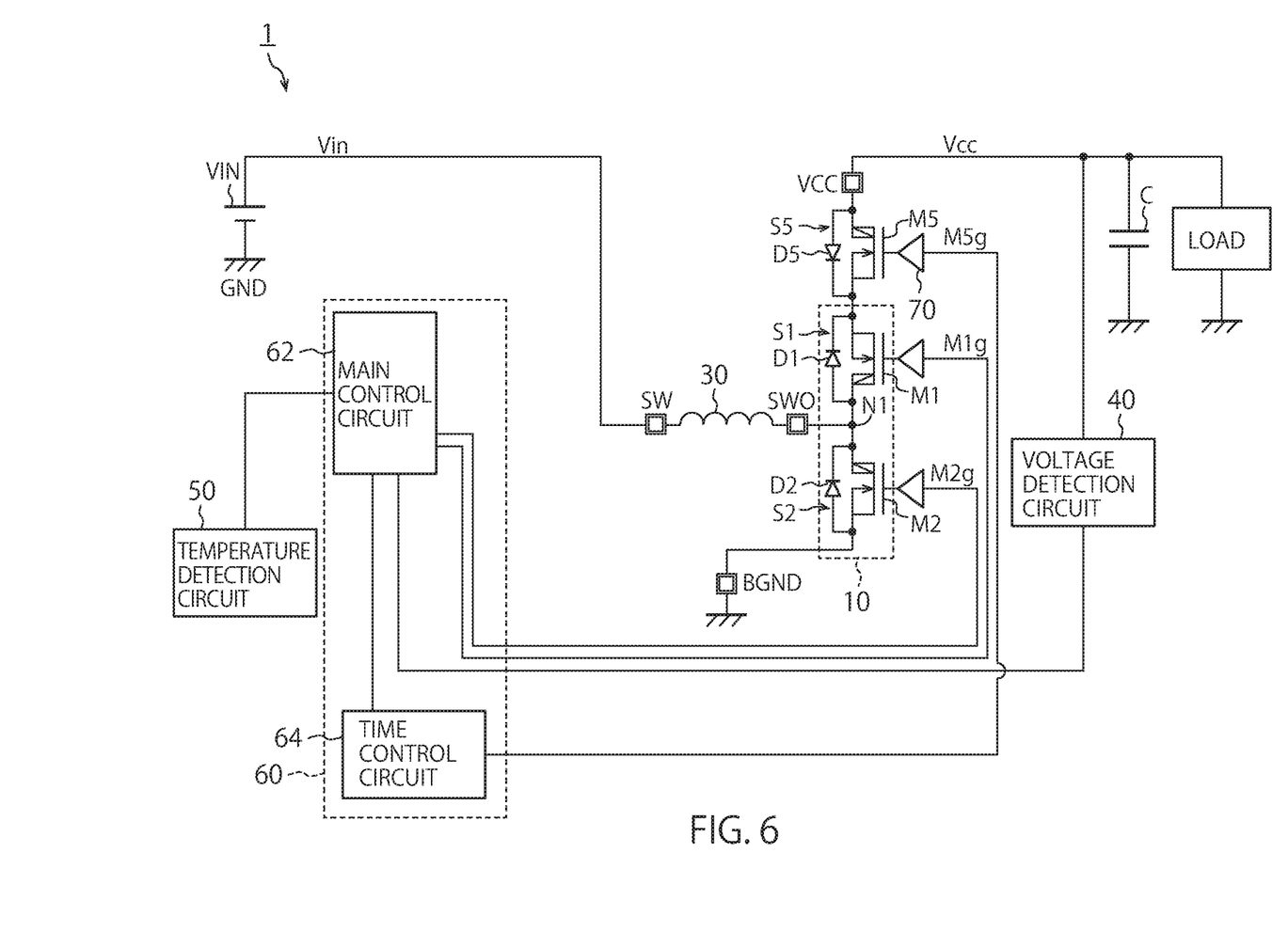
FIG. 6 is a block diagram illustrating a configuration of a power circuit according to a third embodiment.

FIG. 6 is a block diagram illustrating a configuration of the power circuit 1 according to the third embodiment. As illustrated in FIG. 6, the power circuit 1 according to the third embodiment is different from the power circuit 1 according to the first embodiment in not having the second circuit 20.

Figure 7:
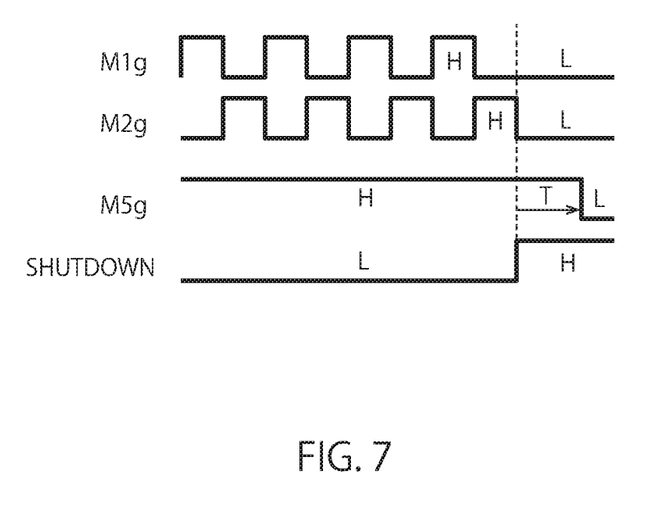
FIG. 7 is a timing chart of a first circuit according to the third embodiment.

FIG. 7 is a timing chart illustrating a relation among the gate signals M1g, M2g, and M5g for the first, second, and fifth switching elements M1, M2, and M5 and the shutdown signal SHUTDOWN according to the third embodiment. The gate signals M1g, M2g, and M5g and the shutdown signal SHUTDOWN are illustrated in this order from the top. The vertical axis represents respective values of the signals and the horizontal axis represents a time. In the present embodiment, the first, second, and fifth switching elements M1, M2, and M5 are brought into conduction with the H signal and are brought into non-conduction with the L signal.

As illustrated in FIG. 7, the fifth switching element M5 is brought into conduction and the first and second switching elements M1 and M2 are alternately switched. Accordingly, the power circuit 1 operates as a step-up DC-DC converter having a relation Vin<Vcc. The output voltage Vcc in this case is determined by the ratio Dtg1 of the conduction time of the first switching element M1 as indicated by the expression (2).

The main control circuit 62 alternately generates the high-level signals (H signals) and the low-level signals (L signals) of the gate signal M1g and the gate signal M2g at the time of a normal step-up operation. Accordingly, when the gate signal M1g is the high-level signal, the first switching element M1 is brought into conduction and the second switching element M2 is brought into non-conduction. Conversely, when the gate signal M1g is the low-level signal, the first switching element M1 is brought into non-conduction and the second switching element M2 is brought into conduction.

Meanwhile, when an abnormality detection signal is input from the voltage detection circuit 40 or the temperature detection circuit 50 as described above, the main control circuit 62 provides the low-level signal (L signal) as the gate signals M1g and M2g to the first and second switching elements M1 and M2, respectively. At the same time, the main control circuit 62 provides the high-level signal (H signal) as the shutdown signal SHUTDOWN to the time control circuit 64 in response to input of the abnormality detection signal. With the time control circuit 64, after the predetermined delay time T (the expression (1)) passes, the gate signal M5g for the fifth switching element M5 is switched to the low-level signal and the fifth switching element M5 is brought into non-conduction.

In this way, according to the present embodiment, when the first and second switching elements M1 and M2 are to be brought into non-conduction, the control circuit 60 brings the fifth switching element M5 into non-conduction after the delay time T passes from a time the first and second switching elements M1 and M2 have been brought into non-conduction. Accordingly, the coil energy of the inductor 30 is discharged to the capacitor C and the load via the power-supply voltage output terminal VCC during the delay time T and therefore an increase of the voltage at the switch terminal SWO after the fifth switching element M5 is brought into non-conduction can be prevented.

While some embodiments of the present invention have been explained above, these embodiments are presented as examples and are not intended to limit the scope of the invention.

For example, while an example of a power-supply voltage output circuit has been explained as the power circuit, these embodiments can be similarly applied also to a power circuit serving as a current source. These novel embodiments described herein may be embodied in a variety of other forms, and various omissions, substitutions, and changes may be made without departing from the spirit of the inventions. These embodiments and modifications fall within the scope and spirit of the inventions as well as the inventions described in the scope of claims and their equivalents.

The invention claimed is:

1. A power circuit supplying a voltage or a current from an output terminal to a load, the circuit comprising:
   a first circuit comprising a first switching element having one end connected to a first node and the other end connected to a side of the output terminal, a second switching element having one end connected to the first node and the other end connected to a GND terminal, and a parasitic diode connected in parallel to the first switching element and configured to pass a current in a direction of the load;
   a second circuit comprising a third switching element having one end connected to a power supply of a higher potential than that of the GND terminal and the other end connected to a second node, and a fourth switching element having one end connected to the second node and the other end connected to the GND terminal;
   an inductor connected between the first node and the second node;
   a fifth switching element connected between the other end of the first switching element and the output terminal; and
   a control circuit configured to
   bring the fifth switching element into conduction when switching control on at least two of the first to fourth switching elements is to be executed according to an output to the load connected via the output terminal, and
   bring the fifth switching element into non-conduction after a predetermined delay time passes from a time the first to fourth switching elements have been brought into non-conduction when the first to fourth switching elements are all to be brought into non-conduction.

2. The circuit of claim 1, wherein
the control circuit
brings the third and fifth switching elements into conduction and brings the fourth switching element into non-conduction when step-up control by alternately switching the first and second switching elements is to be executed, and
brings the fifth switching element into non-conduction after the predetermined delay time passes from a time the first to third switching elements have been brought into non-conduction when the first to third switching elements are to be brought into non-conduction.

3. The circuit of claim 1, wherein
the control circuit
brings the first and fifth switching elements into conduction and brings the second switching element into non-conduction when step-down control by alternately switching the third and fourth switching elements is to be executed, and
brings the fifth switching element into non-conduction after a predetermined delay time passes from a time the first, third, and fourth switching elements have been brought into non-conduction when the first, third, and fourth switching elements are to be brought into non-conduction.

4. The circuit of claim 1, wherein
the control circuit
brings the fifth switching element into conduction when step-up/down control by switching the first to fourth switching elements is to be executed, and
brings the fifth switching element into non-conduction after a predetermined delay time passes from a time the first to fourth switching elements have been brought into non-conduction when the first to fourth switching elements are to be brought into non-conduction.

5. The circuit of claim 1, further comprising a parasitic diode connected in parallel to the fifth switching element and configured to pass a current in an opposite direction to a direction of a load.

6. The circuit of claim 1, wherein the control circuit sets the predetermined delay time to a time in which energy stored in the inductor becomes equal to or lower than a predetermined level due to discharging through the fifth switching element.

7. The circuit of claim 1, wherein the control circuit sets the predetermined delay time to a time proportional to a constant-number multiple of a current flowing through the inductor.

8. The circuit of claim 1, wherein the control circuit brings the first to fourth switching elements into non-conduction when a voltage supplied to the load exceeds a predetermined range.

9. The circuit of claim 1, wherein the control circuit brings the first to fourth switching elements into non-conduction when a temperature of a semiconductor chip on which the inductor is placed exceeds a predetermined temperature.

10. A control method of a power circuit supplying a voltage or a current from an output terminal to a load, the circuit comprising:
   a first circuit comprising a first switching element having one end connected to a first node and the other end connected to a side of the output terminal, a second switching element having one end connected to the first node and the other end connected to a GND terminal, and a parasitic diode connected in parallel to the first switching element and configured to pass a current in a direction of the load;
   a second circuit comprising a third switching element having one end connected to a power supply of a higher potential than that of the GND terminal and the other end connected to a second node, and a fourth switching element having one end connected to the second node and the other end connected to the GND terminal;
   an inductor connected between the first node and the second node; and
   a fifth switching element connected between the other end of the first switching element and the output terminal, the method comprising:
   bringing the fifth switching element into conduction to execute switching control on at least two of the first to fourth switching elements according to an output to the load connected via the output terminal; and
   bringing the fifth switching element into non-conduction after a predetermined delay time passes from a time the first to fourth switching elements have been brought into non-conduction when the first to fourth switching elements are to be brought into non-conduction.

11. A self-driving device comprising a power circuit, the circuit supplying a voltage or a current from an output terminal to a load, the circuit comprising:
- a first circuit comprising a first switching element having one end connected to a first node and the other end connected to a side of the output terminal, a second switching element having one end connected to the first node and the other end connected to a GND terminal, and a parasitic diode connected in parallel to the first switching element and configured to pass a current in a direction of the load;
- a second circuit comprising a third switching element having one end connected to a power supply of a higher potential than that of the GND terminal and the other end connected to a second node, and a fourth switching element having one end connected to the second node and the other end connected to the GND terminal;
- an inductor connected between the first node and the second node;
- a fifth switching element connected between the other end of the first switching element and the output terminal; and
- a control circuit configured to
- bring the fifth switching element into conduction when switching control on at least two of the first to fourth switching elements is to be executed according to an output to the load connected via the output terminal, and
- bring the fifth switching element into non-conduction after a predetermined delay time passes from a time the first to fourth switching elements have been brought into non-conduction when the first to fourth switching elements are all to be brought into non-conduction.

12. The device of claim 11, wherein
the control circuit
brings the third and fifth switching elements into conduction and brings the fourth switching element into non-conduction when step-up control by alternately switching the first and second switching elements is to be executed, and
brings the fifth switching element into non-conduction after the predetermined delay time passes from a time the first to third switching elements have been brought into non-conduction when the first to third switching elements are to be brought into non-conduction.

13. The device of claim 11, wherein
the control circuit
brings the first and fifth switching elements into conduction and brings the second switching element into non-conduction when step-down control by alternately switching the third and fourth switching elements is to be executed, and
brings the fifth switching element into non-conduction after a predetermined delay time passes from a time the first, third, and fourth switching elements have been brought into non-conduction when the first, third, and fourth switching elements are to be brought into non-conduction.

14. The device of claim 11, wherein
the control circuit
brings the fifth switching element into conduction when step-up/down control by switching the first to fourth switching elements is to be executed, and
brings the fifth switching element into non-conduction after a predetermined delay time passes from a time the first to fourth switching elements have been brought into non-conduction when the first to fourth switching elements are to be brought into non-conduction.

15. The device of claim 11, further comprising a parasitic diode connected in parallel to the fifth switching element and configured to pass a current in an opposite direction to a direction of a load.

16. The device of claim 11, wherein the control circuit sets the predetermined delay time to a time in which energy stored in the inductor becomes equal to or lower than a predetermined level due to discharging through the fifth switching element.

17. The device of claim 11, wherein the control circuit sets the predetermined delay time to a time proportional to a constant-number multiple of a current flowing through the inductor.

18. The device of claim 11, wherein the control circuit brings the first to fourth switching elements into non-conduction when a voltage supplied to the load exceeds a predetermined temperature.

* * * * *